Figure 2:
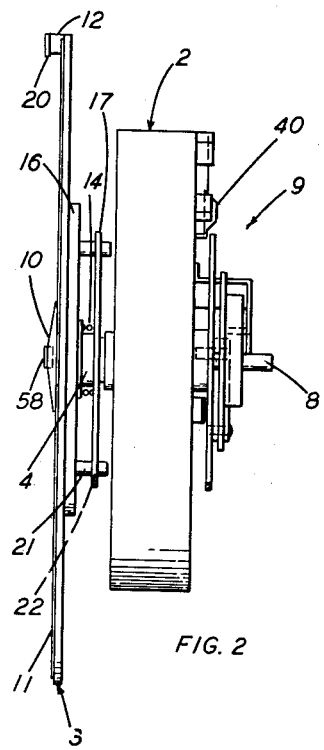

April 4, 1961

J. DAUGHERTY 2,978,287

RECORDING CHART CHANGER

Filed June 24, 1957

4 Sheets-Sheet 1

INVENTOR.
JOE DAUGHERTY

INVENTOR.
JOE DAUGHERTY

April 4, 1961   J. DAUGHERTY   2,978,287
RECORDING CHART CHANGER
Filed June 24, 1957
4 Sheets-Sheet 3

INVENTOR.
JOE DAUGHERTY

April 4, 1961 J. DAUGHERTY 2,978,287
RECORDING CHART CHANGER

Filed June 24, 1957

4 Sheets-Sheet 4

INVENTOR.
JOE DAUGHERTY

United States Patent Office
2,978,287
Patented Apr. 4, 1961

2,978,287
RECORDING CHART CHANGER

Joe Daugherty, Dallas, Tex., assignor, by mesne assignments, to Mullins Manufacturing Company, Dallas, Tex., a corporation of Texas Filed June 24, 1957, Ser. No. 667,326

13 Claims. (Cl. 346—137)

This invention relates to new and useful improvements in metering instruments. The invention is directed more particularly to the type of metering instruments which continuously record the meter readings on a graduated cardboard disc or chart which turns at a uniform rate of speed beneath a stylus, pen, or pencil so that a continuous record of the magnitude of the variable being metered is recorded on the chart, and the magnitude of this variable at any given time can be later determined by reference to said chart.

Recording meters of this type have found wide acceptance in industry. This is particularly true in all industries where continuous metering is required. One example, which is by no means exclusive, is the oil and gas industry. In that industry it is of great importance that the flow of oil or natural gas at the wellhead be accurately and continuously metered, and that a record be maintained, in order that the lessor may receive the proper amount of royalties due him and that the lessee have accurate information as to production in order that his accounts can be kept accurately.

There are numerous brands of meters of the type described above on the market. Depending upon angular speed at which the circular chart is made to turn, these meters can record data for periods ranging from several minutes to several days. However, as the time is extended it is necessary that the circular chart be made to revolve more slowly, adversely affecting the accuracy of the data recorded. Increasing the speed at which the circular calibrated disc or chart revolves will result in increased accuracy of the recorded data but has, in the past, made it necessary that some person replace the calibrated metering card on each instrument that much sooner. In operations which are extended over a larger territory, such as an oil or gas field, the necessity for sending a man to each metering instrument once each day for the purpose of changing the disc is inconvenient and expensive. Furthermore, inclement weather frequently slows the progress of the person changing the discs causing the records to be incomplete.

It is the purpose of this invention to provide a mechanism for removing the used disc when its record is complete and replacing it to record the meter readings for the next period of time which the disc is designed to cover. As many as forty or more record discs or charts can be used and replaced by an instrument without the necessity of any human attention whatever. This means that in the case of an instrument which records for a period of twenty-four hours between card changes it would be unnecessary for any person to service the instrument more often than once a month.

Numerous efforts have been made in the past to produce a device which would change the record discs automatically at the proper time, but none of the prior devices have proved sufficiently reliable to be acceptable to industry. All the prior attempts involved mechanisms of such complexity that the devices would fail to function entirely unless they were in perfect adjustment and operating conditions were almost ideal.

This invention solves the problem by means of a mechanism which operates on a principle entirely different from the principles on which any earlier attempts at a solution were based. The mechanism is so simple mechanically that it does not require delicate adjustment in order to perform its task, yet is so ingeniously constructed that it can be relied upon to perform its task thousands of times without the necessity of adjustment or repair.

Further objects and advantages of the invention are set forth in the following description, taken with the accompanying drawing, and novel features thereof are pointed out in the appended claims. The disclosure, however, is illustrative only, and changes in detail may be made, especially in matters of shape, size and arrangement of parts within the principle of the invention, to the full extent indicated by the broad general meanings of the terms in which the appended claims are expressed.

Figure 3:
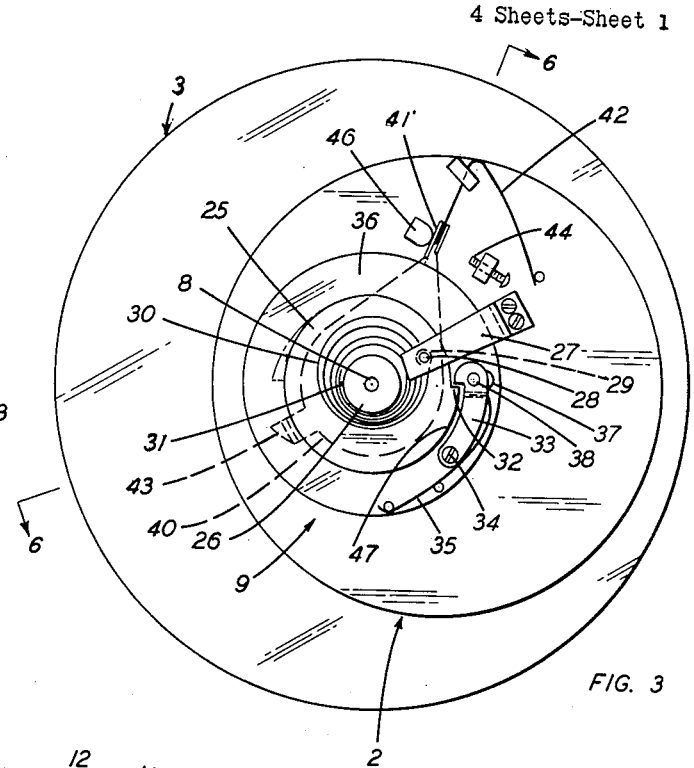
Figure 1:
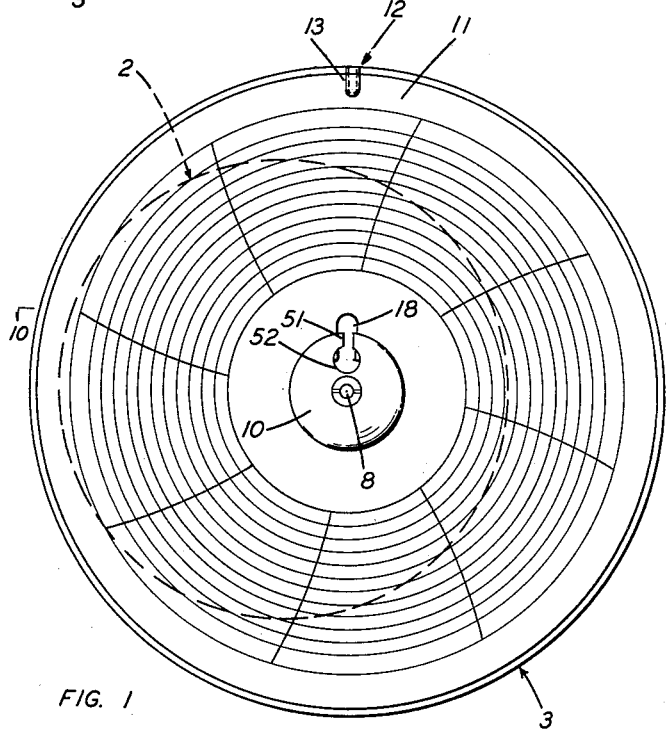
Figure 4:
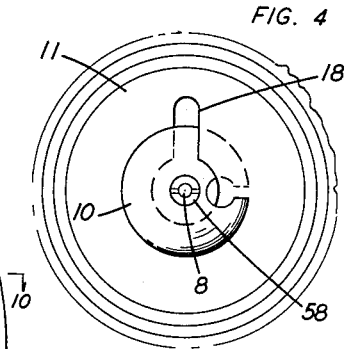
Figure 5:
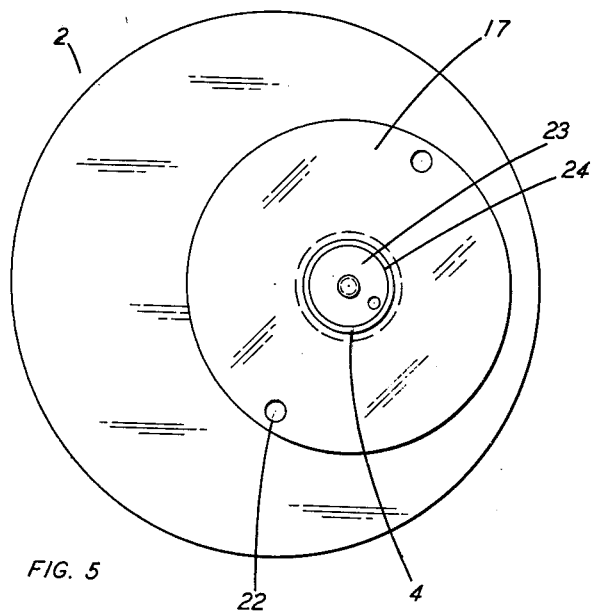
Figure 6:
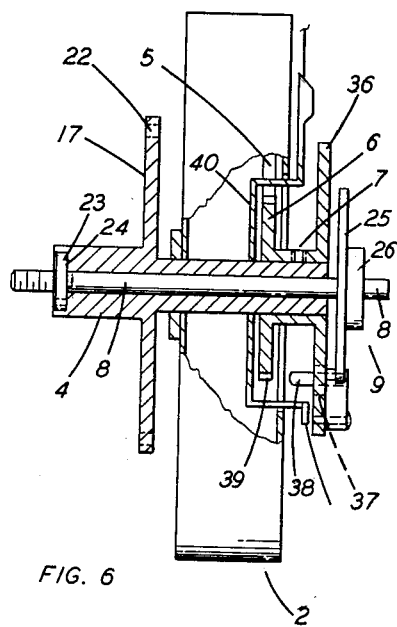
Figure 7:
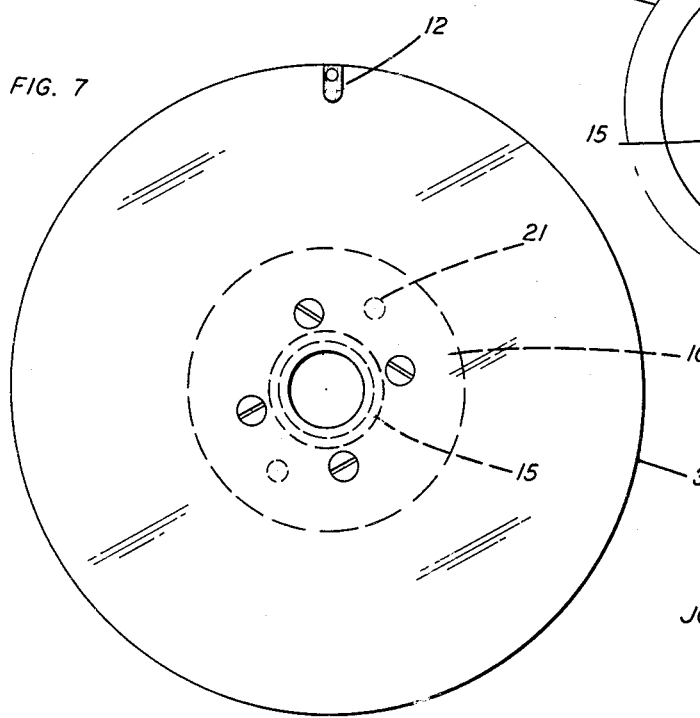
Figure 8:
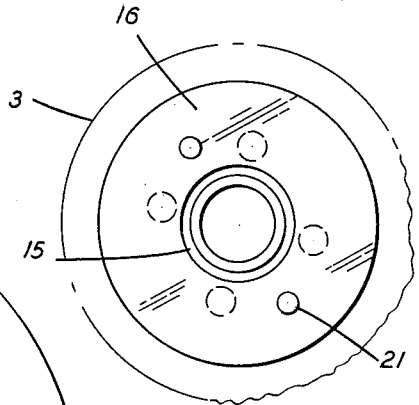
Figure 9:
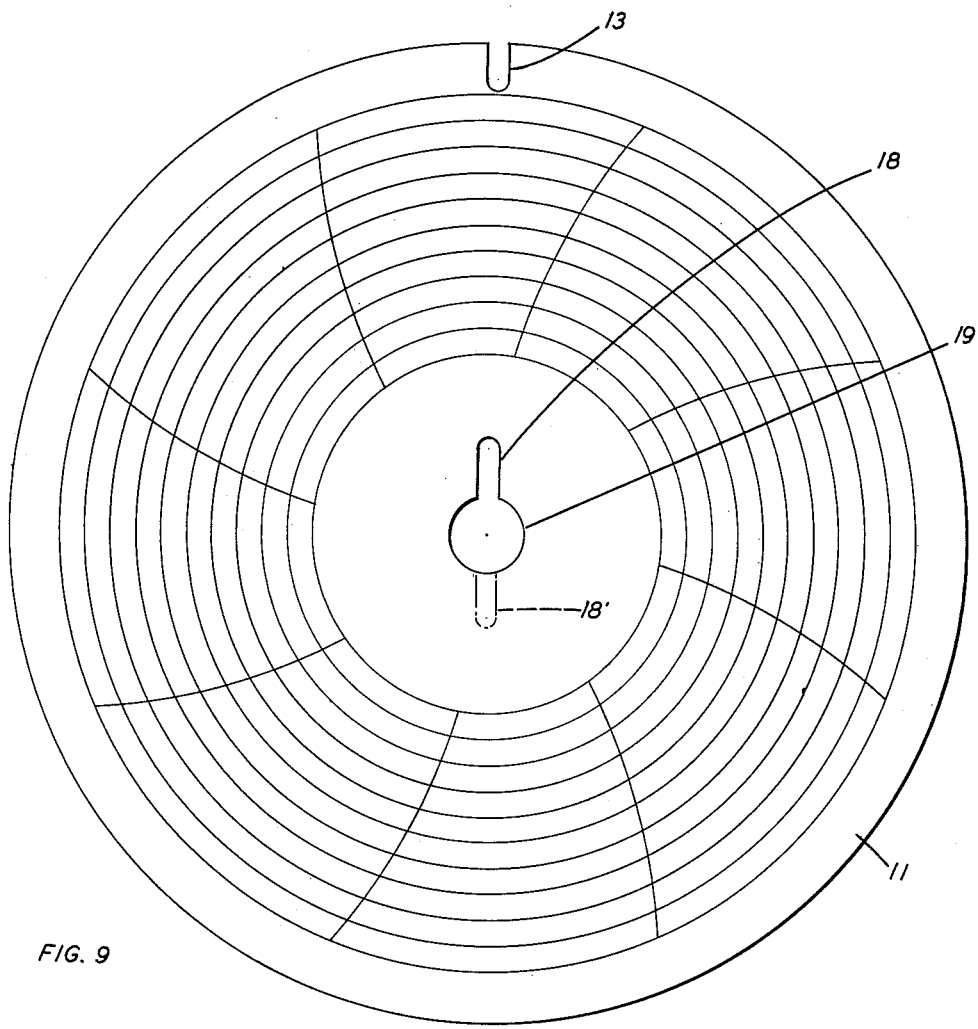
Figure 10:
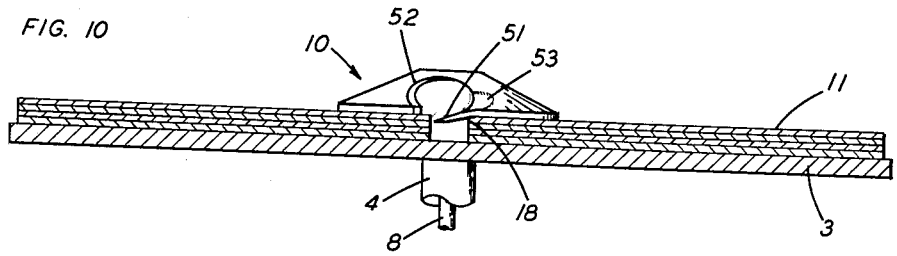
Figure 11:
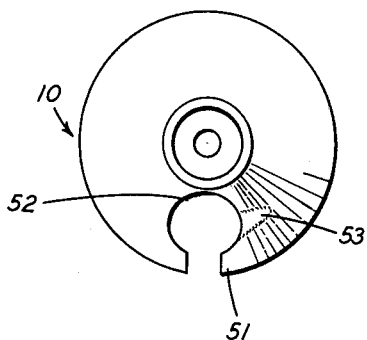
Figure 12:
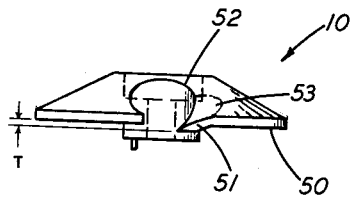

These and other objects and advantages will be apparent from an examination of the following specification and drawing in which:

Fig. 1 is a front elevational view of the chart changing mechanism constructed in accordance with this invention as installed on a standard instrument clock, Fig. 2 is a side elevational view of the device shown in Fig. 1, Fig. 3 is a rear elevational view of the device shown in Fig. 1, Fig. 4 is an enlarged fragmentary detail view of the chart showing the discharge button and the relative position of the top chart and button after a partial revolution of the button, Fig. 5 is a front elevational detail view of the clock mechanism and the associated turntable and discharge button shafts, Fig. 6 is a fragmentary cross-sectional view taken along the lines 6—6 of Fig. 3, Fig. 7 is a front elevational detail view of the turntable of this invention, Fig. 8 is a fragmentary detail view of the back side of the turntable shown in Fig. 7, Fig. 9 is an enlarged detail plan view of the chart employed with the mechanism of this invention, Fig. 10 is a cross sectional view taken along the lines 10—10 of Fig. 1, Fig. 11 is an enlarged detail plan view of the discharge button of this invention, and Fig. 12 is an elevational view of the button shown in Fig. 11.

Referring now more particularly to the characters of reference on the drawing, it will be observed in Figs. 1–3 that the chart changing mechanism of this invention, shown installed on a standard instrument clock identified generally at 2, includes basically a clock rotated turntable 3 which is supported by and turns with turntable shaft 4 as the latter is turned by the clock works indicated at 5 to be in mesh with the shaft drive collar 6. The turntable shaft 4 rigidly engages collar 6 by means of set screw 7. Shaft 4 concentrically surrounds discharge shaft 8 which is connected at its rear end to a flyback mechanism indicated generally at 9, and at its forward end to discharge button 10 by suitable retaining means 58.

A series or stack of graph-bearing charts 11 are placed on turntable 3 in surrounding relation to the enlarged hub of shaft 4. These charts are retained in moderately snug relationship between button 10 and turntable 3, and they are prevented from rotating relative to turntable 3 by a lug 12 which is fixed to turntable 3 and which engages drive slot 13 of the charts 11. A compression spring 14 engages a groove 15 in boss 16 attached to the back side of the turntable 3 and this spring acts against the circular flange 17 to insure that the desired amount of pressure will be maintained between the charts 11 and button 10 even after one or more charts have been discharged. Each of the charts includes a second radial slot 18 which connects with center hole 19. In the chart changing or discharging operation, the centrally located button 10 is adapted to rotate at a predetermined time and automatically separate the top chart only from the series of charts 11 and permit it to fall free of the turntable 3 in a manner to be more fully described hereinafter. It will be noted that the slot 13 is open at the chart circumference so that the lug will not interfere with the fall of the top chart 11. It is therefore desirable to set the mentioned predetermined time to occur when the lug is at its top center position of rotation. This lug 12 includes an enlarged outer flange 20 to prevent the slot 13 from becoming disengaged from lug 12 due to the curling action of charts 11 which might occur during high humidity conditions.

The chart 11, by means of the described lug 12, is made to rotate with the turntable 3 which in turn is caused to rotate by the driving force of the turntable shaft 4 through its enlarged circular flange 17 which slidably engages the turntable 3 by the cooperation of turntable drive pins 21 and the flange holes 22.

The centrally extending discharge shaft 8 includes a front located disk 23 which recesses into a counterbore 24 of shaft 4, and includes an integral cam 25 and a spring anchor hub 26. Referring to Figs. 2, 3, and 6 the construction of flyback mechanism 9 which operates to impart a rapid single revolution rotary movement to shaft 8 may be observed. An overhanging stationary spring anchor 27 includes an inwardly projecting pin 28 which engages and anchors the free looped end 29 of drive spring 30, the other end of spring 30 being welded at 31 to hub 26 of discharge shaft 8. Cam 25, being integral with hub 26 and shaft 8 will turn with the latter under the action of drive spring 30 when this spring is released. Cam 25 includes a radial notch 32 which normally engages pawl 33 which is pivoted about screw 34 and is spring loaded into this engagement by the action of wire spring 35. Pawl 33 is supported from the enlarged disk end 36 of drive collar 6 so that when the pawl 33 is in engagement with the cam 25 the shaft 8 will rotate in unison with shaft 4 and the clock mechanism 5. Disk 36 includes an elongated slot 37 through which a projecting pin 38 from pawl 33 extends in free working relation to a point intermediate the distance to the drive collar gear 39. A trigger structure 40 is freely connected about shaft 4 and is spring anchored at its outer end 41 by a wire spring 42. A small cam 43 is integrally attached to trigger 40 at a spaced circumferential distance from end 41 and extends into the area between gear 39 and disk 36 so that it will be in the circular path of pin 38 when the latter rotates with drive collar 6. When pin 38 has rotated to a point of engagement with cam 43 it will push cam 43 ahead of it causing trigger 40 to rotate until such time that end 41 engages stop screw 44. Upon this occurrence the resistance offered pin 38 by the now stationary cam 43 is sufficient to cause pawl 33 to rotate slightly about its pivot pin 34 and in so doing, the pawl 33 disengages notch 32, and cam 25 is at this point no longer restrained, permitting spring 30 to uncoil and rotate disk 26 and discharge shaft 8. Immediately after this occurrence, there is no longer any frictional restraint on the catch end of pawl 33 and the pressure of wire spring 42 is then sufficient to impart a slight additional outward movement to the pawl 33 to permit pin 38 to completely clear cam 43. When cam 43 is thus cleared from any back resistance from pin 38, the pressure of wire spring 42 will cause trigger end 41 to move from stop screw 44 back to its initial position against stop 46 and consequently the cam 43 will have moved the same amount and will be completely clear of pin 38 so that the latter and pawl 32 (under the pressure of its spring 35) may return to its innermost radial position and engage notch 32 at the completion of only one revolution by cam 25 and shaft 8. The clock mechanism 5 continues to rotate and carry plate 36 and cam 25 around with it so that spring 30 will be rewound between each discharge rotation. In order to provide a positive method of moving pin 38 outward to fully clear small cam 43, the large cam 25 is made with radius at its largest point sufficient to cause pin 38 to move the desired distance when the largest point (indicated at 47) has engaged the tip 48 of pawl 33. To provide this desired cam action it is merely necessary to flatten or otherwise slightly reduce the radial distance of cam 25 between the largest point 47 and the notch 32.

The discharge button 10 shown in enlarged detail in Figs. 10–12 has a bottom surface 50 in a plane perpendicular to its driving discharge shaft 8 except that lip 51 on one side of notch 52 is depressed by one chart thickness so that this lip comes in contact with one edge of slot 18 in chart 11 it begins to dip down when passing across the slot until the depressed edge has reached a depth of one card thickness so that it rotates at this level and inserts its thin edge 51 between the top card and the next adjacent card and during rotation moves around and under this top chart 11 by a screw type action until the top chart drops off. The degree of thickness of edge 51 is such that it is sharp enough to find its way under the top card but dull enough not to cut into the paper chart 11. The upper surface of the button 10 may be flattened adjacent the lip 51, as shown in 53, to facilitate the passage of the chart over the balance of the button 10.

The mechanism shown will provide accurate release for the topmost chart 11 when button 10 has moved a full revolution. A second embodiment is shown in phantom in Fig. 9 wherein a plurality of slots are provided in the button 10 and a corresponding plurality of slots 18' are provided in chart 11 so that the chart may be released in less than a full revolution, such as one-half a revolution when two slots are provided, one fourth a revolution when four slots are provided, etc.

The term "chart" as used in this specification is used to identify any flat data recording material such as for example time vs. function graphs, photographic film plates, sound records, or discs of any kind used for any purpose which may require changing or removal.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A chart changing mechanism for recording devices utilizing recording charts having annular recording areas surrounding central non-recording areas with mounting apertures therein and openings contiguous to the apertures and within the central areas, said mechanism including, means for mounting a series of superposed charts on the mechanism and adapted to be received in the mounting apertures thereof, means for securing the charts on the mounting means and overlying only the central non-recording areas of the charts, the securing means having a featheredge thereon, said featheredge having a leading edge located so as to enter through the chart openings from engagement with the outermost chart and into engagement with the next adjacent chart, and means for causing predetermined relative rotational movement between the securing means and the charts to pass the featheredge into the opening contiguous to the mounting aperture of the outermost chart and to pass the securing means by rotation beneath the outermost chart to discharge the outermost of the series of charts at predetermined intervals, the securing means having a central area smaller than the mounting apertures of the charts so as to be capable of passing therethrough, the chart openings extending outwardly a distance greater than the featheredge of the securing means and communicating with said apertures after the charts are removed.

2. A chart changing mechanism for recording devices utilizing recording charts having annular recording areas surrounding central non-recording areas with mounting apertures therein and openings contiguous to the apertures and within the central areas, said mechanism including, means for mounting a series of superposed charts on the mechanism and adapted to be received in the mounting apertures thereof, means for securing the charts on the mounting means and overlying only the central non-recording areas of the chart, the securing means having a portion rotationally alined with the openings of the charts and arranged and adapted to enter through the chart openings from engagement with the outermost chart and into engagement with the next lowermost chart when predetermined relative rotational movement between the securing means and the charts occurs, and means for causing predetermined relative rotational movement between the securing means and the charts to pass the rotationally alined portion of the securing means into the opening of the outermost chart and to pass the securing means by rotation beneath the outermost chart to discharge the outermost of the series of charts at predetermined intervals, the securing means having a central area smaller than the mounting apertures of the charts so as to be capable of passing therethrough, the chart openings extending outwardly a distance greater than the rotationally alined portion of the securing means and communicating with said apertures after the chart are removed.

3. A chart changing mechanism as set forth in claim 2 wherein the securing means is a slotted button having an offset lip for entry into the chart opening.

4. A chart changing mechanism as set forth in claim 2 wherein the securing means is a relatively flat and approximately circular conical button having a central portion no larger than the chart aperture.

5. A chart changing mechanism as set forth in claim 2, and a lug on the mounting means for engaging and holding the charts against revolution with respect to the mounting means.

6. A chart changing mechanism as set forth in claim 2, and a flanged lug on the mounting means for engaging and holding the charts against revolution with respect to the mounting means.

7. A chart changing mechanism as set forth in claim 2, and means for revolving the mounting means and the securing means in unison including detent means connecting the securing means to the mounting means, the means for establishing relative rotational movement between the securing means and the charts including a spring connected to the securing means and adapted to be wound as the securing means is revolved with the mounting means as to revolve the securing means in a reverse direction when the detent means is released, and means for releasing the detent means.

8. A chart changing mechanism as set forth in claim 2, and means for revolving the mounting means and the securing means in unison including detent means connecting the securing means to the mounting means, the means for establishing relative rotational movement between the securing means and the charts including a spring connected to the securing means and adapted to be wound as the securing means is revolved with the mounting means so as to revolve the securing means in a reverse direction when the detent means is released, and means for releasing the detent means including a pawl mounted for limited rotational movement with respect to the mounting means.

9. A chart changing mechanism as set forth in claim 2 wherein the mounting means includes a central shaft received in the chart apertures, a chart-backing turntable movable inwardly and outwardly on the shaft toward and away from the securing means, and spring means constantly urging the turntable outwardly on the shaft toward the securing means.

10. A chart changing mechanism as set forth in claim 2, wherein the securing means is a slotted button having a lip offset the thickness of one chart for entry into the chart opening.

11. A chart changing mechanism for recording devices utilizing recording charts having annular recording areas surrounding central non-recording areas with mounting apertures therein and openings contiguous to the apertures and within the central areas, said mechanism including means for mounting a series of superposed charts on the mechanism and adapted to be received in the mounting apertures thereof, means for securing the charts on the mounting means and overlying only the central non-recording areas of the charts, the securing means having a portion rotationally alined with the openings of the charts and arranged and adapted to enter through the chart openings from engagement with the outermost chart and into engagement with the next lowermost chart when predetermined relative rotational movement between the securing means and the charts occurs, and means for causing predetermined relative rotational movement between the securing means and the charts to pass the rotationally alined portion of the securing means into the opening of the outermost chart and between the outermost chart and the next adjacent chart and to pass the securing means by rotation beneath the outermost chart to discharge the outermost of the series of charts at predetermined intervals, the securing means having a central area smaller than the mounting apertures of the charts so as to be capable of passing therethrough, the chart openings extending outwardly a distance greater than the rotationally alined portion of the securing means and communicating with said apertures after the charts are removed.

12. A chart changing mechanism for recording devices utilizing recording charts having annular recording areas surrounding central non-recording areas with mounting apertures therein and openings contiguous to the apertures and within the central areas, said mechanism including means for mounting a series of superposed charts on the mechanism and adapted to be received in the mounting apertures thereof, means for securing the charts on the mounting means and overlying only the central non-recording areas of the charts, the securing means having a portion rotationally alined with the openings of the charts and arranged and adapted to enter through the chart openings from engagement with the outermost chart and into engagement with the next lowermost chart when predetermined relative rotational movement between the securing means and the charts occurs, and means for causing predetermined relative rotational movement between the securing means and the charts to pass the rotationally alined portion of the securing means into the opening of the outermost chart and to pass the securing means by rotation beneath the outermost chart to discharge the outermost of the series of charts at predetermined intervals, said securing means having a maximum radial dimension less than the maximum distance by which any portion of the chart openings are spaced from the center of the securing means, the securing means having a central area smaller than the mounting apertures of the charts so as to be capable of passing therethrough, the chart openings extending outwardly a distance greater than the rotationally alined portion of the securing means and communicating with said apertures after the charts are removed.

13. A chart changing mechanism for recording devices utilizing recording charts having annular recording areas surrounding central non-recording areas with mounting apertures therein and slots contiguous to the apertures and within the central areas, said mechanism including means for mounting a series of superposed charts on the mechanism and adapted to be received in the mounting apertures thereof, means for securing the charts on the mounting means and overlying only the central non-recording areas of the charts, the securing means having a portion rotationally alined with the slots of the charts and arranged and adapted to enter through the chart slots from engagement with the outermost chart and into engagement with the next lowermost chart when predetermined relative rotational movement between the securing means and the charts occurs, and means for causing predetermined relative rotational movement between the securing means and the charts to pass the rotationally alined portion of the securing means into the slot of the outermost chart and to pass the securing means by rotation beneath the outermost chart to discharge the outermost of the series of charts at predetermined intervals, the securing means having a central area smaller than the mounting apertures of the charts so as to be capable of passing therethrough, the chart slots extending outwardly a distance greater than the rotationally alined portion of the securing means and communicating with said apertures after the charts are removed.

References Cited in the file of this patent

UNITED STATES PATENTS

| | | |
|---|---|---|
| 506,988 | Fecht | Oct. 17, 1893 |
| 807,996 | Beede | Dec. 19, 1905 |
| 1,718,318 | Tojek | June 25, 1929 |
| 1,720,148 | Rodanet | July 9, 1929 |
| 1,873,633 | Pitter | Aug. 23, 1932 |
| 2,328,703 | Becwar | Sept. 7, 1943 |
| 2,631,919 | Dueringer | Mar. 17, 1953 |
| 2,703,745 | Smith | Mar. 8, 1955 |
| 2,739,031 | Meer | Mar. 20, 1956 |
| 2,926,059 | Squier | Feb. 23, 1960 |

FOREIGN PATENTS

| | | |
|---|---|---|
| 646,988 | Great Britain | Dec. 6, 1950 |